(12) United States Patent
Clemen

(10) Patent No.: US 12,435,876 B2
(45) Date of Patent: Oct. 7, 2025

(54) COMBUSTION CHAMBER ASSEMBLY FOR AN ENGINE WITH AT LEAST ONE HEAT EXCHANGER CHANNEL FOR FUEL TO BE INJECTED

(71) Applicant: Rolls-Royce Deutschland Ltd & Co KG, Blankenfelde-Mahlow (DE)

(72) Inventor: Carsten Clemen, Mittenwalde (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 810 days.

(21) Appl. No.: 17/728,371

(22) Filed: Apr. 25, 2022

(65) Prior Publication Data

US 2025/0146666 A1 May 8, 2025

(30) Foreign Application Priority Data

Apr. 26, 2021 (DE) .......................... 10 2021 110 614

(51) Int. Cl.
*F23R 3/00* (2006.01)
*F23R 3/28* (2006.01)

(52) U.S. Cl.
CPC .............. *F23R 3/005* (2013.01); *F23R 3/002* (2013.01); *F23R 3/283* (2013.01)

(58) Field of Classification Search
CPC .. F23R 3/00; F23R 3/002; F23R 3/005; F23R 3/045; F23R 3/30; F23R 3/283; F23R 3/286

See application file for complete search history.

(56) References Cited

U.S. PATENT DOCUMENTS

| 4,399,652 A | 8/1983 | Cole et al. |
| 5,802,841 A * | 9/1998 | Maeda ................... F23R 3/005 60/39.182 |

(Continued)

FOREIGN PATENT DOCUMENTS

| DE | 69631991 T2 | 1/2005 |
| DE | 102009003603 A1 | 9/2009 |

(Continued)

OTHER PUBLICATIONS

German Search Report dated Feb. 22, 2022 from counterpart German Patent Application No. 10 2021 110 614.1.

(Continued)

*Primary Examiner* — William H Rodriguez
(74) *Attorney, Agent, or Firm* — SHUTTLEWORTH & INGERSOLL, PLC; Timothy J. Klima

(57) ABSTRACT

A combustion chamber assembly for an engine includes a combustion chamber defining a combustion space delineated by a combustion chamber wall and extending in a main flow direction from a combustion chamber head to a combustion chamber outlet. A fuel injection system is joined to the wall at the combustion chamber head and has a fuel feed for fuel and a nozzle head for injecting the fuel into the combustion space. The wall also has an integrated heat exchanger duct via which the fuel is routed within a first duct section of the heat exchanger duct which is connected to the fuel line from the combustion chamber head in the direction of the combustion chamber outlet and, after flowing through a deflection region, in a second duct section of the heat exchanger duct, back in the direction of the combustion chamber head and of the nozzle head.

26 Claims, 11 Drawing Sheets

(56) References Cited

U.S. PATENT DOCUMENTS

Figure 1:
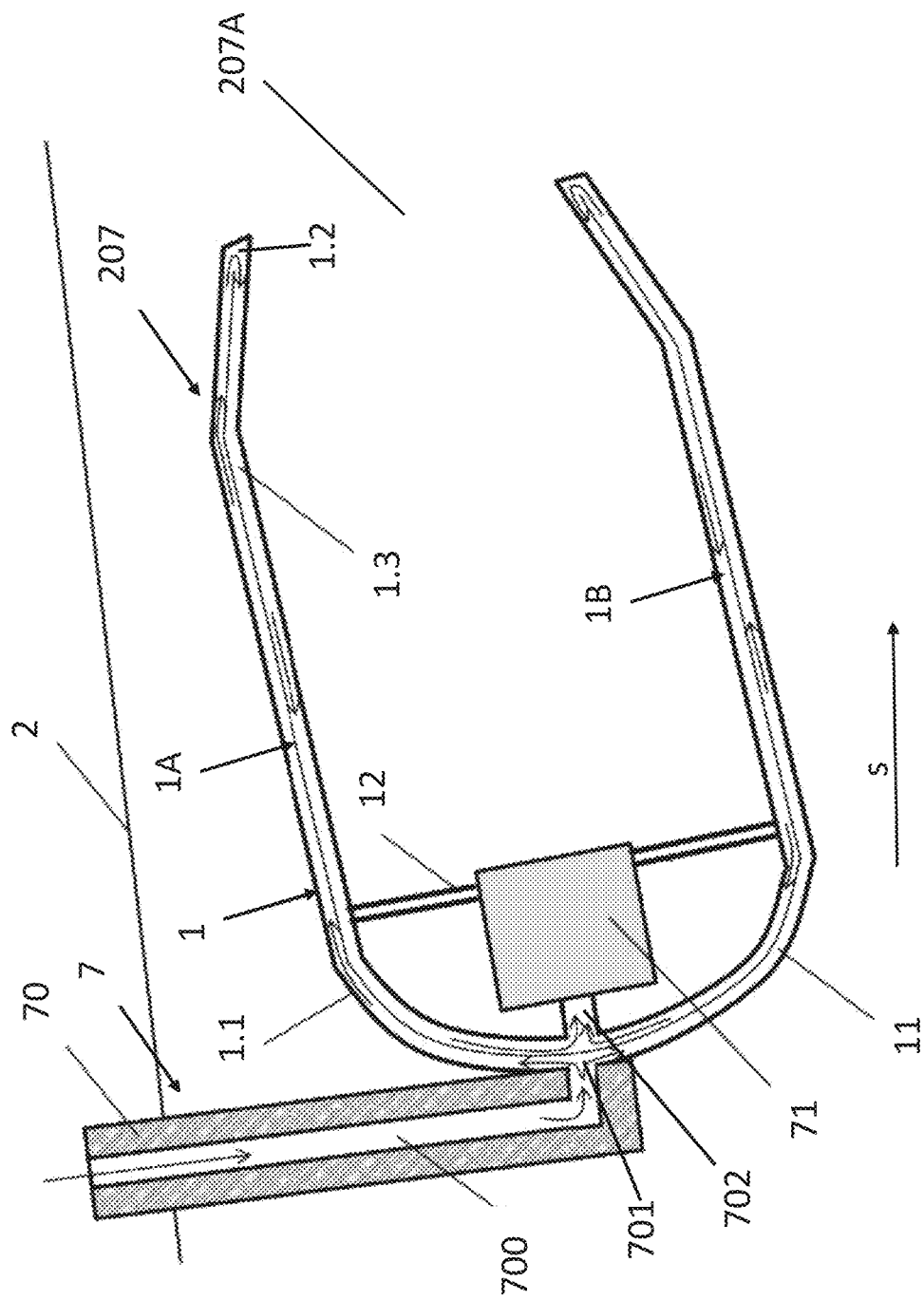

| | | | | |
|---|---|---|---|---|
| 5,865,030 | A * | 2/1999 | Matsuhama | F02C 7/224 60/737 |
| 9,243,803 | B2 * | 1/2016 | Berry | F23R 3/283 |
| 9,759,426 | B2 * | 9/2017 | Johnson | F23R 3/10 |
| 9,803,866 | B2 * | 10/2017 | Yoshino | B05B 1/14 |
| 10,344,982 | B2 * | 7/2019 | Berry | F23R 3/28 |
| 10,578,306 | B2 * | 3/2020 | Purcell | F23R 3/343 |
| 10,655,858 | B2 * | 5/2020 | Bailey | F23R 3/36 |
| 11,079,113 | B2 * | 8/2021 | Tada | F23R 3/283 |
| 11,384,940 | B2 * | 7/2022 | Cook | F02C 7/228 |
| 11,525,578 | B2 * | 12/2022 | Natarajan | F23R 3/46 |
| 11,692,710 | B2 * | 7/2023 | Tada | F23D 11/383 60/737 |
| 11,940,354 | B2 * | 3/2024 | Ziminsky | F02C 9/46 |
| 12,050,062 | B2 * | 7/2024 | Berry | F28D 1/0308 |
| 2007/0277528 | A1 * | 12/2007 | Homitz | F23D 14/58 60/737 |
| 2017/0218845 | A1 | 8/2017 | Snyder | |
| 2020/0025379 | A1 * | 1/2020 | Jones | F23R 3/06 |
| 2020/0217509 | A1 | 7/2020 | Lakshmanan et al. | |
| 2020/0386186 | A1 * | 12/2020 | Suzuki | F23R 3/005 |

FOREIGN PATENT DOCUMENTS

| | | |
|---|---|---|
| DE | 102018113824 A1 | 12/2018 |
| JP | H11264542 A | 9/1999 |
| JP | 2016079828 A | 5/2016 |
| WO | 9714875 A1 | 4/1997 |
| WO | 2013009211 A1 | 1/2013 |

OTHER PUBLICATIONS

European Search Report dated Sep. 8, 2022 from counterpart European App No. ep22168115.
Database WPI, Week 199952, Thomson Scientific, London, GB; AN 1999-605537 XP002807480.

* cited by examiner

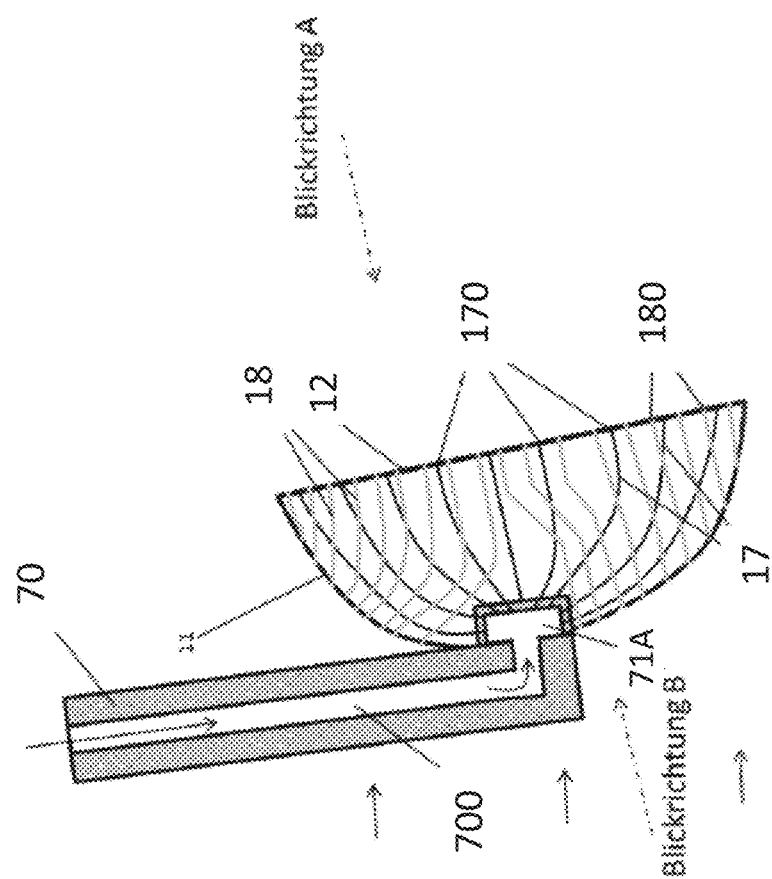
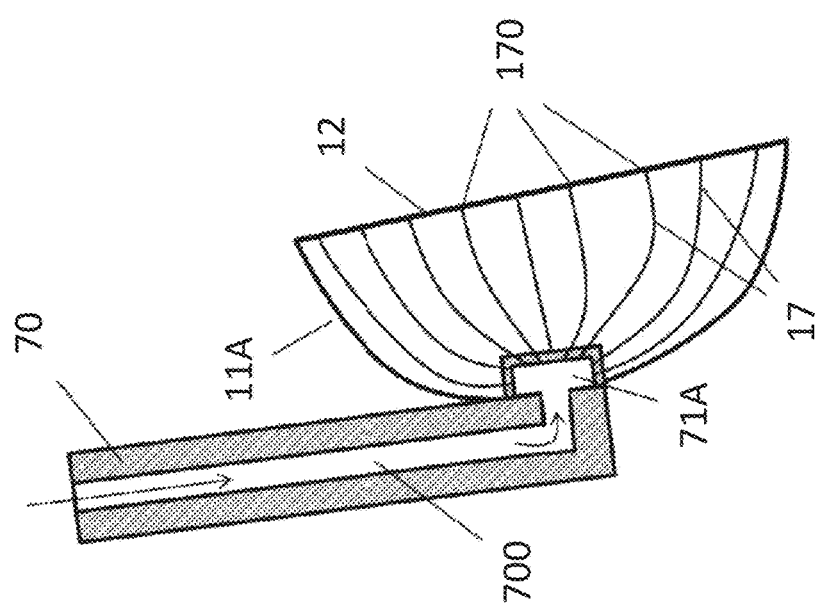
FIG. 5B
FIG. 5A

COMBUSTION CHAMBER ASSEMBLY FOR AN ENGINE WITH AT LEAST ONE HEAT EXCHANGER CHANNEL FOR FUEL TO BE INJECTED

This application claims priority to German Patent Application DE102021110614.1 filed Apr. 26, 2021, the entirety of which is incorporated by reference herein.

The proposed solution relates to a combustion chamber assembly for an engine, especially for an engine operated with hydrogen.

In engines that have been in customary practical use to date, for example those operated with kerosene as fuel, in a combustion chamber, the air and fuel are injected into a combustion space of the combustion chamber via at least one fuel nozzle, in order to provide an ignitable air-fuel mixture. The fuel nozzle for provision of the air-fuel mixture comprises a nozzle head having outflow openings at an end face of the nozzle head. This end face, in the intended installation state of the fuel nozzle, faces a combustion space of the combustion chamber. Typically, the fuel here is injected via a first outflow opening that appears to be circular at the end face. The first outflow opening for the fuel is thus configured in the manner of an annular gap. A second outflow opening for air to be injected, which is on the radial inside based on a main flow direction of the fuel to be injected, also typically has a circular progression at the end face. The same applies to at least one additional third outflow opening at the end face of the nozzle head or at a passage opening that accommodates the nozzle head in a heat shield of the combustion chamber. The multiple different outflow openings for air and fuel thus typically each take the form of circular rings in the manner of annular gaps in terms of their cross section. This is then also regularly associated with a circular cylindrical design of the nozzle head of the fuel nozzle.

While the above-described configuration of a nozzle head of a fuel nozzle has proven itself for liquid fuel to be injected, for example kerosene, there is further need for improvement with regard to engines operated with a gaseous fuel, e.g. hydrogen, and hence fuel to be injected in gaseous form.

It should particularly be taken into account here that gaseous fuel, for example hydrogen, still has a comparatively low temperature under some circumstances when injected through a fuel nozzle of a fuel injection system. Thus, in the case of hydrogen, preheating of the hydrogen is crucial before the hydrogen is injected. But corresponding preheating may also be advantageous in the case of other fuels.

For example, WO 97/14875 A1 proposes guiding a fuel to be injected firstly via lines along a combustion chamber wall before the fuel is guided to a combustion chamber head of the combustion chamber, where it is injected via a fuel nozzle into a combustion space of the combustion chamber.

What is in turn proposed in US 2020/0217509 A1 is provision of heat transfer ducts for air at a nozzle stem of a fuel nozzle in order to preheat fuel flowing in the direction of a nozzle head by means of air coming from a compressor. The air utilized for preheating is utilized here for heat transfer by the countercurrent principle in the nozzle stem and then guided back out of the nozzle stem into a flow space surrounding the combustion chamber, i.e. is not injected directly into the combustion space. Instead, division of an air flow is envisaged at the nozzle stem upstream of the nozzle head, such that a portion of the incoming air is utilized for preheating of the fuel and another portion is guided to the nozzle head in order to be injected into the combustion space.

The solutions known from the prior art for preheating of fuel to be injected always make use of merely comparatively short and/or few flow pathways in order to heat the fuel and/or utilize a cooled air flow at most indirectly for provision of an air-fuel mixture in the combustion space. Specifically in the case of hydrogen as fuel to be injected, which is kept in liquid form at an extremely low temperature in a hydrogen reservoir, the solutions known from the prior art are in need of improvement.

A combustion chamber assembly as disclosed herein provides a remedy here, and the aspects of the combustion chamber assembly disclosed herein may also be combined with one another.

In a first aspect of the proposed solution, a combustion chamber assembly for an engine is provided, comprising inter alia a combustion chamber that defines a combustion space delineated by a combustion chamber wall and extending in a main flow direction from a combustion chamber head to a combustion chamber outlet. A fuel injection system which is joined to the combustion chamber wall at the combustion chamber head comprises at least one fuel feed for fuel and a nozzle head for the injection of the fuel into the combustion space. The combustion chamber wall also has at least one integrated heat exchanger duct via which the fuel is routed within a first duct section of the heat exchanger duct which is connected to the fuel line from the combustion chamber head in the direction of the combustion chamber outlet and, after flowing through a deflection region, in a second duct section of the heat exchanger duct, back in the direction of the combustion chamber head and of the nozzle head.

In the solution proposed, the returned heated fuel is consequently routed to the nozzle head and injected into the combustion space via at least one (first) outflow opening provided at the nozzle head, together with air. By virtue of the guiding of the fuel from the combustion chamber head in the direction of the combustion chamber outlet and back again within the combustion chamber wall, it is possible to effectively utilize the high temperature that exists in the combustion space for preheating of the fuel over a comparatively long flow pathway and to achieve efficient heat transfer. The combustion chamber wall and optionally also the combustion chamber head may thus have a double-wall design in order to heat the fuel prior to injection at the nozzle head.

At the same time, the heat exchanger duct is intended for cooling of the combustion chamber wall by means of the fuel guided therein, before the fuel reaches the nozzle head. Especially in the case of utilization of hydrogen as fuel for an engine and the associated comparatively low temperatures of the hydrogen, efficient cooling of the combustion chamber wall is possible in this way. For cooling of the combustion chamber wall, a distinctly smaller amount of cooling air flow should thus be guided along an outer shell surface of the combustion chamber wall, in order to sufficiently cool the combustion chamber wall. It may even be the case that a corresponding cooler air flow can be dispensed with entirely. In any case, much more air flowing from a compressor in the direction of the combustion chamber is available for the combustion in the combustion space. This can in turn lead to a reduction in emissions with regard to NOx emissions. Moreover, efficient combustion chamber wall cooling extends the lifetime of the combustion chamber.

In the solution proposed, fuel flows from the fuel feed firstly into the first duct section of the heat exchanger duct. The recycled heated fuel is then routed in turn through the second duct section of the heat exchanger duct in the direction of the combustion chamber head. The second duct section may be connected here to a fuel line via which the preheated fuel is then routed to the nozzle head.

In one design variant, the combustion chamber wall has an inner shell surface facing the combustion space and an opposing outer shell surface. The first duct section then, for example, adjoins the outer shell surface, while the second duct section adjoins the inner shell surface. The colder fuel flow in the first duct section is thus further to the outside based on the combustion space, while the recycled fuel flow is closer to the combustion space.

Between the first and second duct sections, a dividing wall may be provided within the combustion chamber wall. The first and second duct sections are thus separated from one another by means of such a dividing wall within the combustion chamber wall. It is of course also possible for heat transfer to take place across the dividing wall.

In principle, the first duct section in the combustion chamber wall may extend over a majority of the total length of the combustion space. In particular, the first duct section within the combustion chamber wall may extend essentially over the total length of the combustion space and hence especially up to the combustion chamber outlet. In this way, a substantial portion of the combustion chamber wall is available twice in the main flow direction (for outward flow and return flow of the fuel), in order to heat the fuel prior to injection into the combustion space and simultaneously to provide cooling for the combustion chamber wall. Accordingly, the second duct section envisaged for the recycling of the fuel to the combustion chamber head and the nozzle head should then also be designed with an appropriate length.

In one design variant, the combustion chamber wall, based on the main flow direction (and hence, for example, also based on a center axis of the combustion chamber that runs essentially parallel to the main flow direction), has a radially outer wall section and a radially inner wall section. The combustion chamber wall then has at least one integrated heat exchanger duct each in the radially outer wall section and in the radially inner wall section. In both wall sections, a first and a second duct section are thus provided in each case for the outward flow and return flow of the fuel. This especially includes each heat exchanger duct comprising a dedicated deflecting plate at an opposite end of the respective heat exchanger duct from the combustion chamber head for the connection of its first duct section to its second duct section. What is also included, however, is in particular an alternative design variant in which a common deflection region is provided, via which, in that case, for example, a first duct section of any (first) heat exchanger duct is connected to a second duct section of another (second) heat exchanger duct. In this way, fuel is routed first in the direction of the combustion chamber outlet in a radially inner or radially outer wall section, before the fuel, after flowing through the deflection region, is routed back in the direction of the combustion chamber head in another, radially outer or radially inner wall section. In the latter case, there is thus, based on the main flow direction, at least one cross-connection in the deflection region that runs radially or along the circumference between the heat exchanger ducts of the different wall sections of the combustion chamber wall.

In one design variant, via a distributor connected to the fuel feed which is provided at the combustion chamber head, a fuel flow coming from the fuel feed can be divided between the two heat exchanger ducts of the combustion chamber wall. The distributor connected to the fuel feed may thus be provided and set up to divide a fuel flow coming from the fuel feed between at least two different heat exchanger ducts or the respective first duct sections thereof. Proceeding from the distributor, for example, a portion of the fuel flow coming from the fuel feed thus flows into a radially outer wall section, while another portion of the fuel flow flows into a radially inner wall section.

In principle, the distributor may be set up and provided for equal distribution of the fuel flow between the at least two heat exchanger ducts. Fuel coming from the fuel feed is thus divided by means of the distributor in equal portions between the at least two heat exchanger ducts.

In an alternative design variant, the distributor is set up and provided for a distribution of the fuel flow in different portions between the at least two heat exchanger ducts. This includes, for example, routing 40% or ⅓ of a fuel flow coming from the fuel feed into a first heat exchanger duct, while 60% or ⅔ of the fuel flow is routed into a second heat exchanger duct. Such a different division of the fuel flow may especially take account of a different cooling requirement of the different wall sections of the combustion chamber wall. The division between the different heat exchanger ducts may be fixed here in terms of construction. It may also be the case that an electronically controllable, especially regulated, distribution of the fuel flows is envisaged.

For the preheated fuel recycled in the direction of the combustion chamber head, a fuel line may be provided at the combustion chamber head. This fuel line then serves to feed the fuel recycled to the nozzle head. In the case of a plurality of (at least two) heat exchanger ducts in different wall sections of the combustion chamber wall, each heat exchanger duct may have a second duct section connected to the fuel line (which is then a common fuel line). The fuel line that serves to feed the preheated fuel to the nozzle head may thus be a fuel manifold connected to second duct sections of the different heat exchanger ducts.

In principle, as already elucidated above, it may be the case that the at least two heat exchanger ducts are connected to one another beyond and hence downstream of the combustion chamber head. Such a connection may then be implemented, for example, via the deflection region.

In one design variant, a first duct section of any heat exchanger duct is connected via a (common) deflection region to a second duct section of another heat exchanger duct, such that fuel is routed first within a radially inner or radially outlying wall section (in the cross section) of the combustion chamber wall in the direction of the combustion chamber outlet and then is routed in the other, radially outer or radially inner, wall section back in the direction of the combustion chamber head.

In one design variant, the deflection region, especially a common deflection region for multiple heat exchanger ducts, is provided for cooling of at least one component of a turbine downstream of the combustion chamber. For example, the deflection region may be provided for cooling of a turbine stator, especially of what is called a turbine inlet guide vane, of a turbine downstream of the combustion chamber. The fuel that is then guided as far as the deflection region in the combustion chamber outlet thus serves for additional cooling of a corresponding turbine stator/inlet guide vane.

In a combustion chamber assembly according to a further aspect of the solution proposed, the fuel injection system likewise has at least one fuel feed for the fuel to be injected into the combustion chamber. Additionally provided at the combustion chamber head is a top portion for the provision of an air-fuel mixture, having a multitude of first outflow openings for fuel and a multitude of second outflow openings for air on an end face facing the combustion space. Further provided are heat exchanger ducts for heat transfer between fuel flowing in the top portion to the first outflow openings and air flowing in the top portion to the second outflow openings.

According to this aspect of the solution proposed, heat transfer is thus deliberately allowed and forced in a top portion in the region of the combustion chamber head between the fuel to be injected into the combustion space and the air to be injected into the combustion space, in which case air and fuel are also introduced via the top portion into the combustion space via a multitude of first and second outflow openings. In this aspect too-especially in the case of hydrogen as the fuel utilized—it is possible to achieve more efficient heating of the fuel prior to injection into the combustion space. Furthermore, corresponding heat transfer processes can be effected directly in a top portion of the combustion chamber assembly, and this then also enables the injection of the fuel and the air and hence the provision of a desired fuel-air mixture. The multitude of both first and second outflow openings provided for this purpose in the top portion, specifically in the case of a fuel to be introduced in gaseous form, for example hydrogen, can also enable more efficient mixture formation.

In principle, a combustion chamber assembly in the second aspect may also be combined with a combustion chamber assembly in the first aspect. In that case, for example, it is possible to route fuel recycled via at least one second duct section of a heat exchanger duct on the combustion chamber wall side into a top section having a multitude of further heat exchanger ducts, in order to achieve supplementary heating of the fuel in the top portion prior to injection into the combustion space. However, the second aspect of the solution proposed is not limited to such a design. For instance, a proposed top portion having multiple heat exchanger ducts may also be advantageous irrespective of any heating of fuel within a combustion chamber wall or fuel cooling in a combustion chamber wall.

In principle, a multitude of heat exchanger ducts for fuel and a multitude of heat exchanger ducts for air may be integrated in the top portion. It is possible to increase the heat transfer between the fuel to be injected and the air to be injected by means of two or more and especially a multitude of heat exchanger ducts. It is possible here for the multitude of heat exchanger ducts for fuel and the multitude of heat exchanger ducts for air to be distributed, especially uniformly, in the top portion. However, it is not obligatory here for the uniformly distributed heat exchanger ducts to open into corresponding first or second first and second outflow openings likewise distributed uniformly at the end face. But this is conceivable in one design variant. Alternatively, nonuniform distribution of the first and second outflow openings at the end face of the top portion may be envisaged.

In one design variant, some of the first and second outflow openings at the end face are thus arranged in a pattern in which adjacent (first and second) outflow openings, in a front view of the end face, are separated from one another by an elongated land. In the case of correspondingly arranged outflow openings, the adjacent outflow openings are thus separated from one another merely by a narrow land. The land width of such a land corresponds here, for example, merely to a fraction of a maximum width of the adjacent first and second outflow openings. In this way, it is possible to utilize the area available at the end face efficiently for the introduction of the air-fuel mixture. In this case, particularly the arrangement of the first and second outflow openings in the manner of a honeycomb pattern is conceivable. More particularly, it is possible by virtue of the arrangement of the outflow openings in a pattern with adjacent outflow openings separated from one another merely by an elongated land to achieve an area at the end face filled to an extent of at least 65%, especially at least 75% or at least 85%, with (first and second) outflow openings. In other words, a corresponding percentage and hence a majority of the area available at the end face of the top portion is then occupied by first and second outlet openings.

In principle, the first and second outlet openings may have, for example, a circular or polygonal, especially tetragonal, cross section. Design variants classified as advantageous envisage, for example, a square, rhombus-shaped or hexagonal cross section of the first and/or second outflow openings.

In one design variant, a multitude of inflow openings for air to be routed to the second outflow openings is provided on an outer face of the top portion remote from the combustion space. In that case, air originating, for example, from a compressor of the engine passes via the inflow openings envisaged on the outside of the top portion into corresponding heat exchanger ducts within the top portion that open into the second outflow openings at the end face of the top portion facing the combustion space. The outside of the top portion may be curved here, and especially have convex curvature. For example, the outside of the top portion is designed as a top plate with the multitude of inflow openings.

Alternatively or additionally, the top portion with the heat exchanger ducts integrated therein may be an additively manufactured component. A corresponding component has thus been produced by way of a 3D printing method, by means of which a complex configuration of a multitude of heat exchanger ducts in the top portion is directly possible.

In one design variant, the fuel feed of the fuel injection system is connected to a collector, which is in turn connected to a multitude of heat exchanger ducts in the top portion that are provided for the fuel. The collector thus serves to distribute fuel coming from the fuel feed to the multitude of heat exchanger ducts provided for the fuel in the top portion. More particularly, the collector and the top portion here may be in a one-piece design. Collector and top portion are thus integrated in one component, for example in an additively manufactured component. A bond of the collector to the fuel feed and here, in that case, for example, to a nozzle stem of the fuel injection system that has the fuel feed may be a cohesive bond. More particularly, a bond of the collector to the fuel feed or to a nozzle stem having the fuel feed via at least one weld bond and/or solder bond may be provided.

Rather than a bond of the fuel feed to a collector connected to the heat exchanger ducts on the top portion side, it may also be the case, as already elucidated above, that a top portion according to the second aspect is combined with a fuel-guiding combustion chamber wall according to the first aspect. In this case, in one execution variant, it may be the case, for example, that fuel is guided via the fuel line/manifold on the combustion chamber head side, to which multiple heat exchanger ducts of the combustion chamber wall are connected, to the heat exchanger ducts of the top portion that forms the nozzle head of the fuel injection system. Fuel thus passes via the fuel line/manifold on the combustion chamber head side, to which heated/preheated fuel from the combustion chamber wall is already being guided, to the top portion and the heat exchanger ducts thereof for additional heat transfer in that case prior to injection of the fuel into the combustion space.

In principle, the solution proposed is suitable for the injection of a liquid fuel. However, in one execution variant, the combustion chamber assembly is intended for the injection of a gaseous fuel, especially for the injection of hydrogen into the combustion space of the combustion chamber.

Furthermore, the solution proposed encompasses an engine, especially a hydrogen-operated engine, with a design variant of a proposed combustion chamber assembly according to the first and/or second aspect.

The appended figures illustrate, by way of example, possible design variants of the proposed solution.

Figure 2:
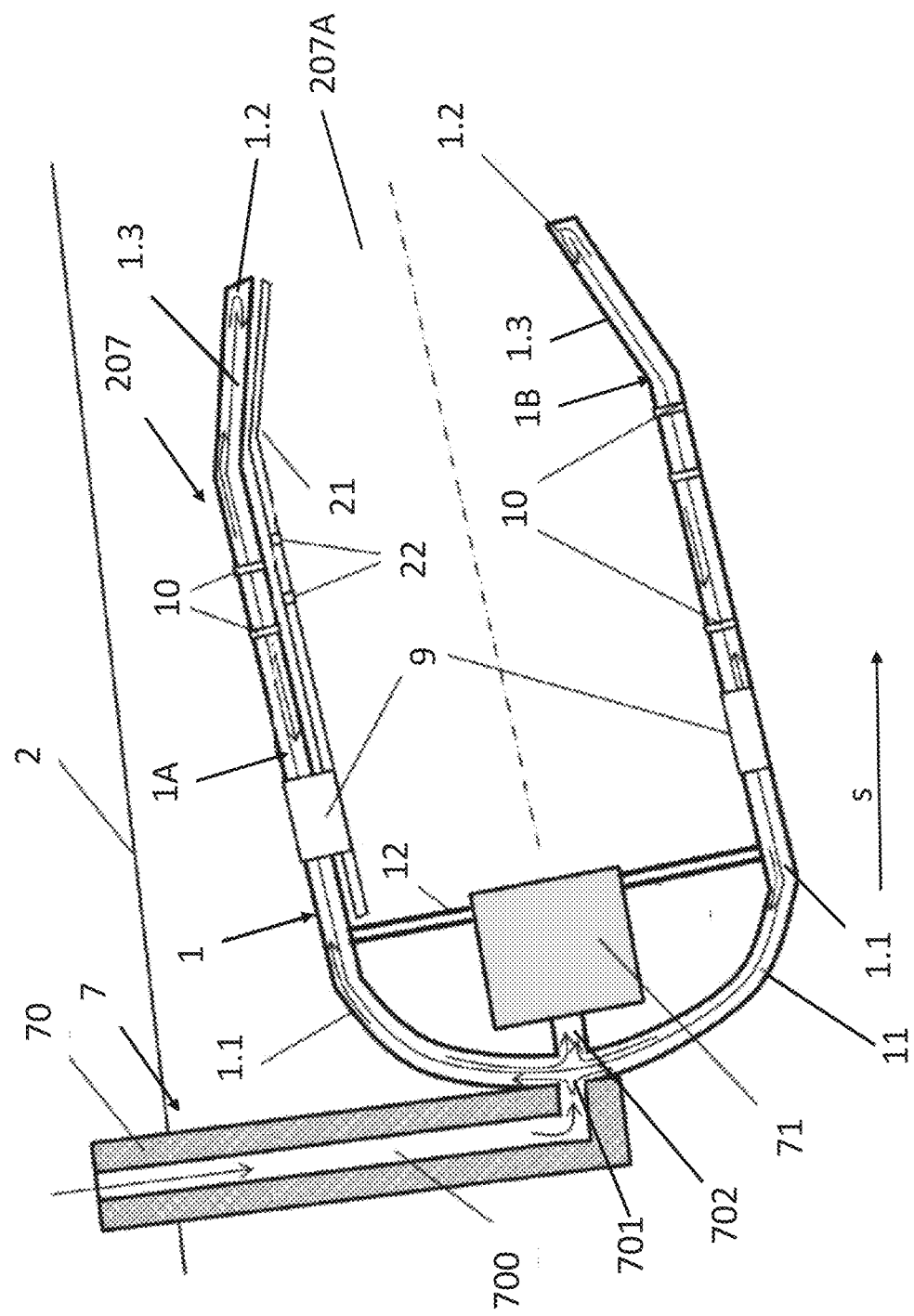
Figure 3:
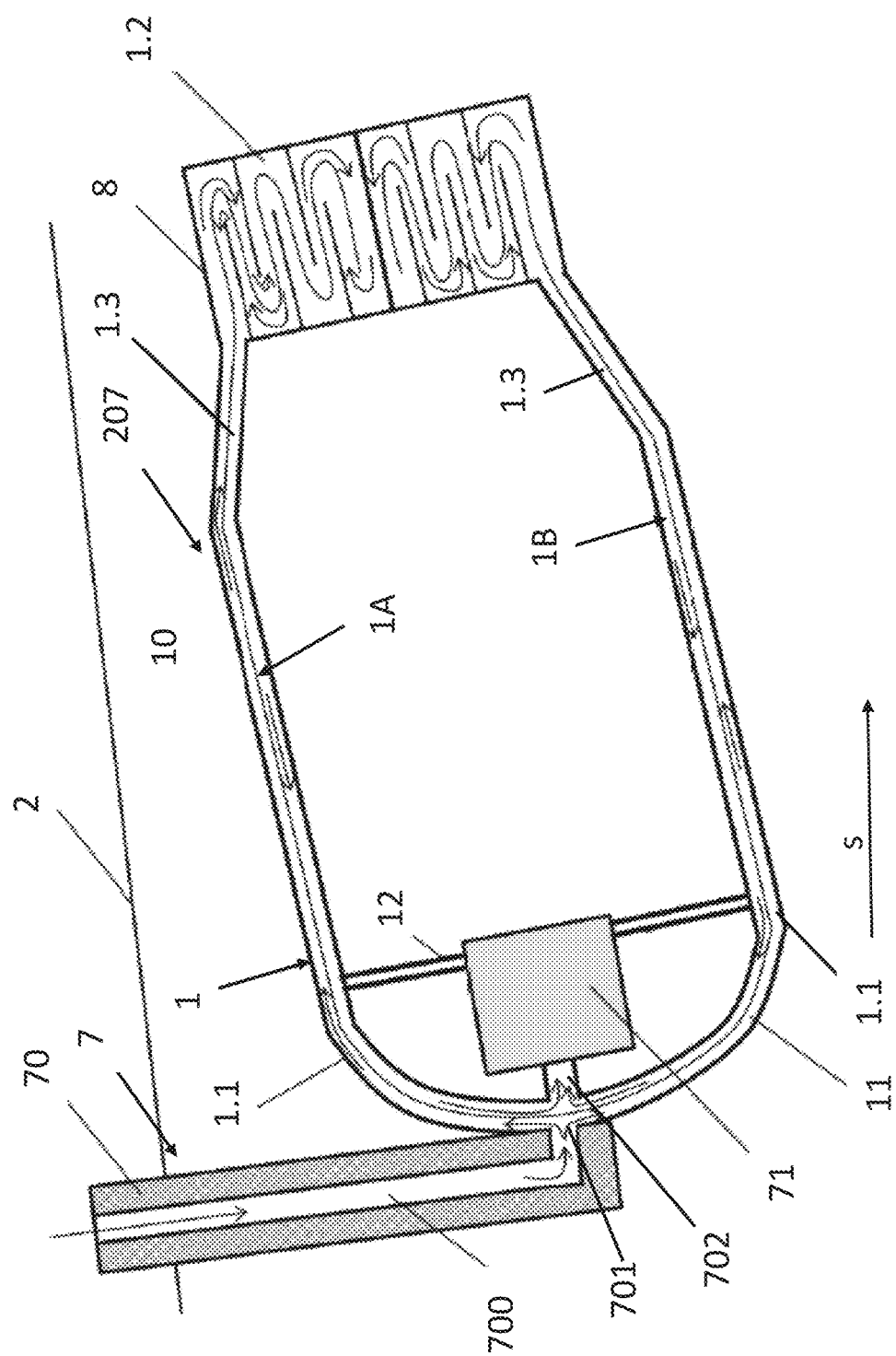
Figure 6B:
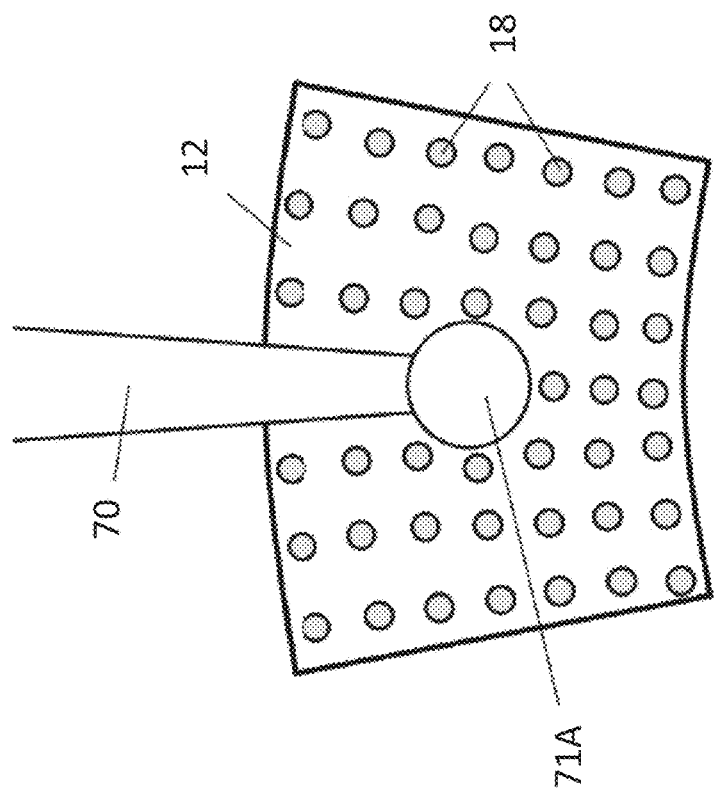
Figure 6A:
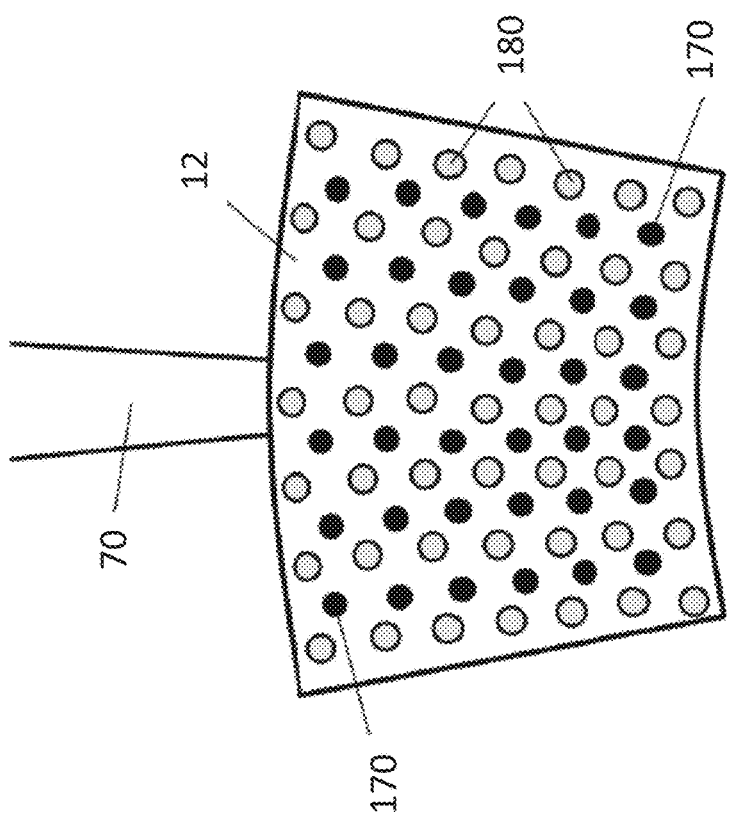
Figure 8:
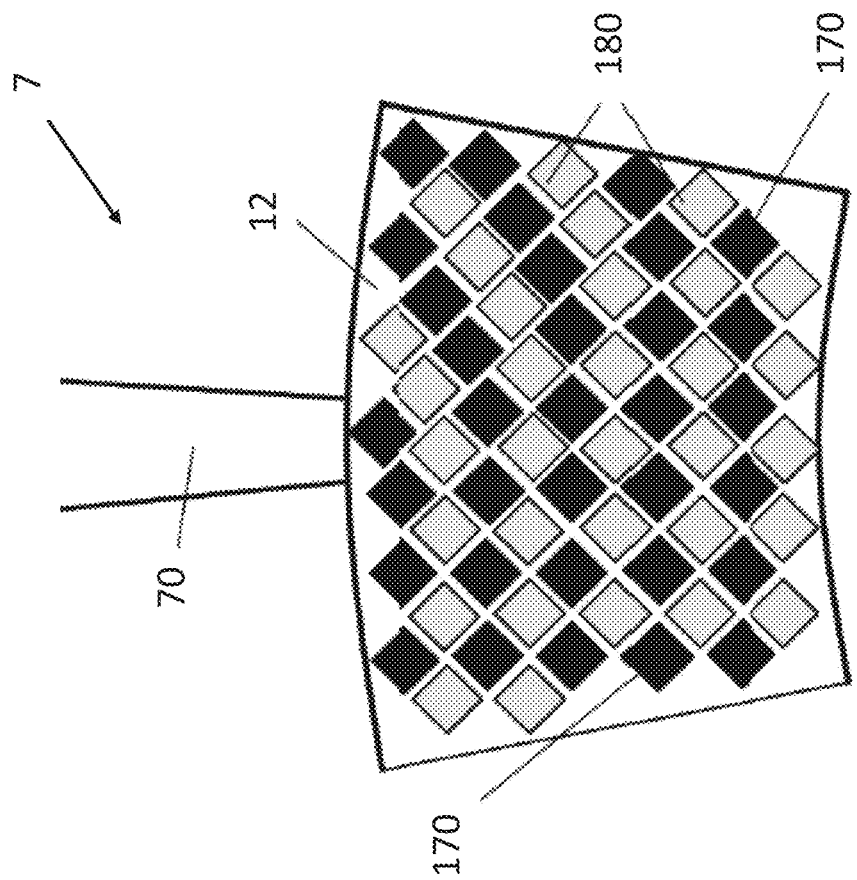
Figure 7A:
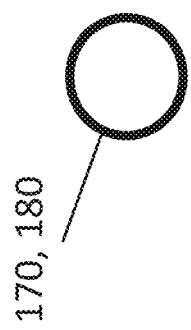
Figure 7B:
Figure 7C:
Figure 9:
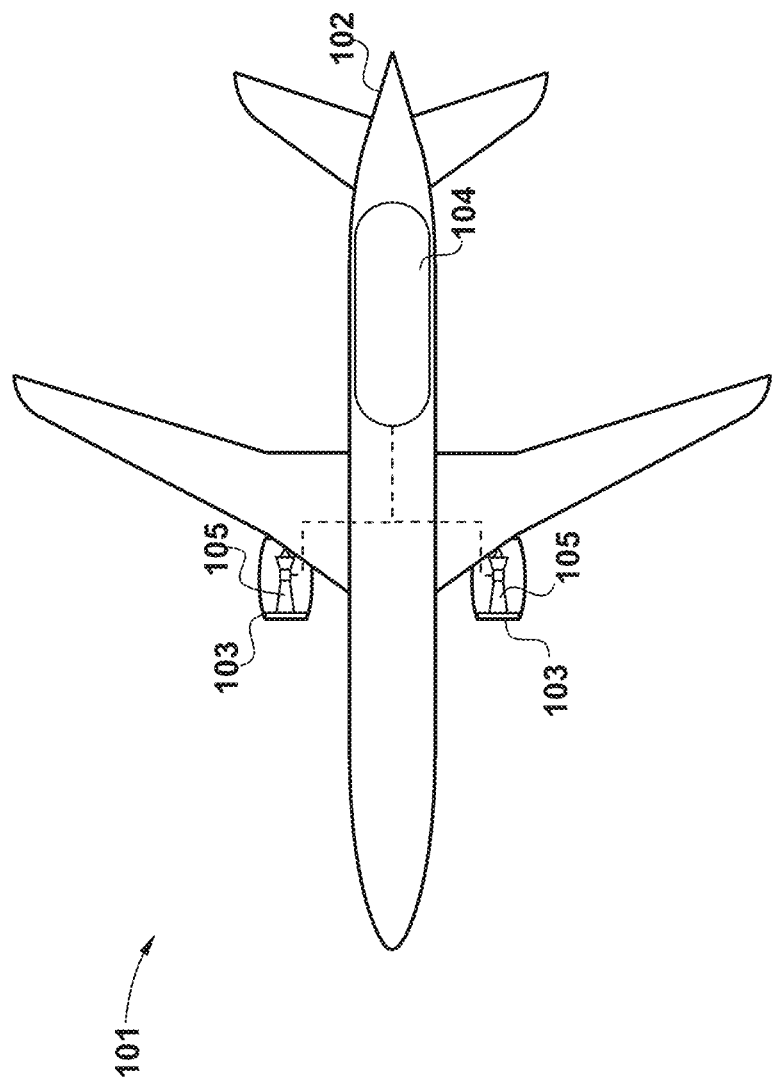
Figure 10:
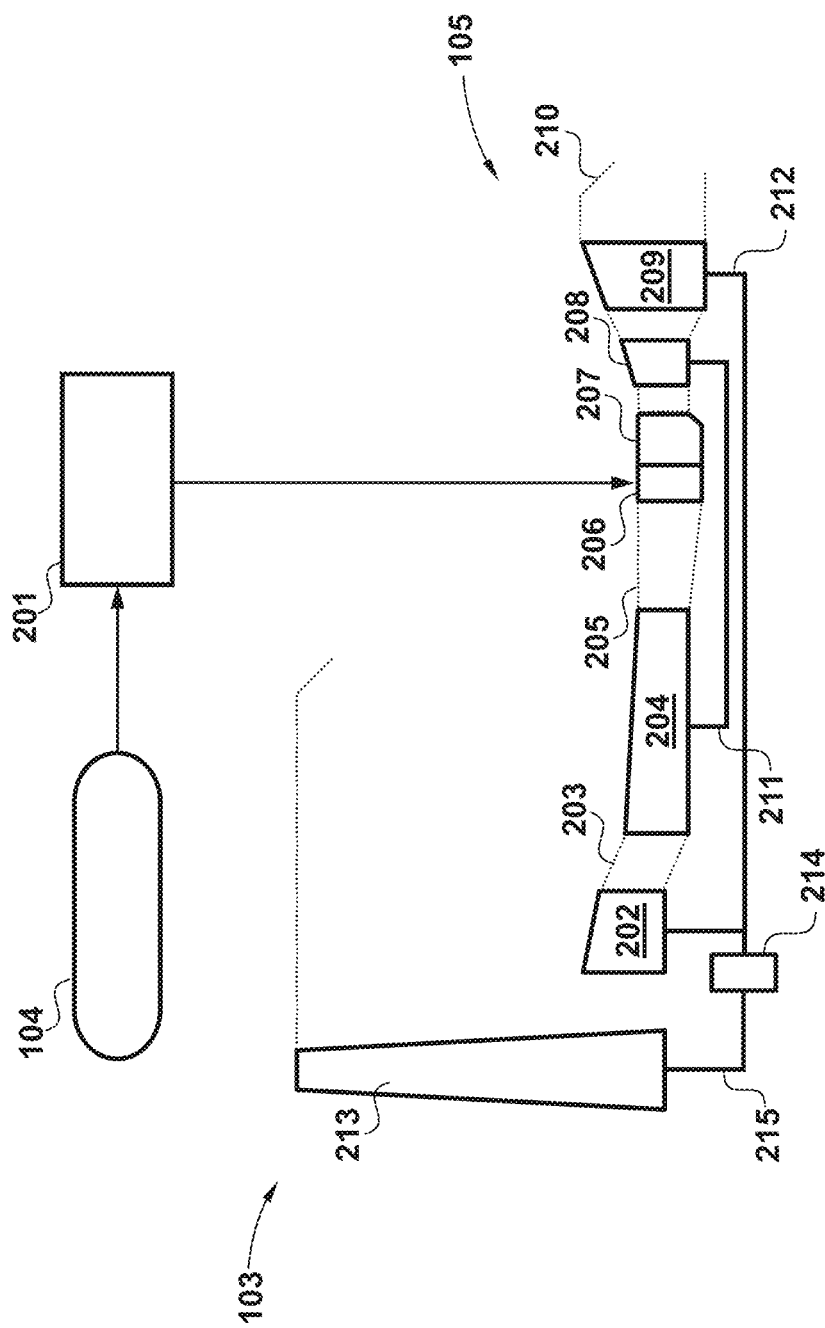
Figure 11:
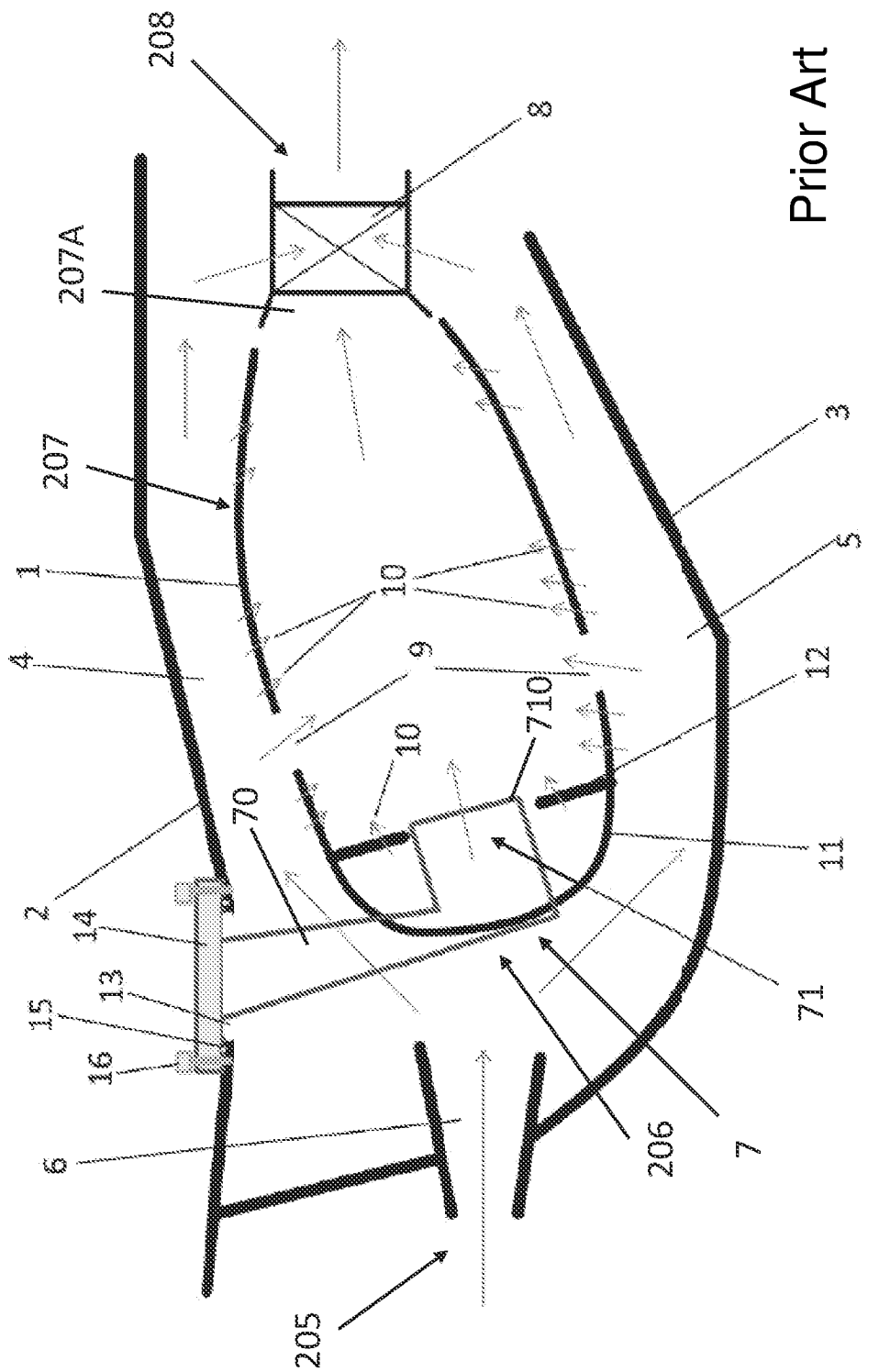
Figure 12:
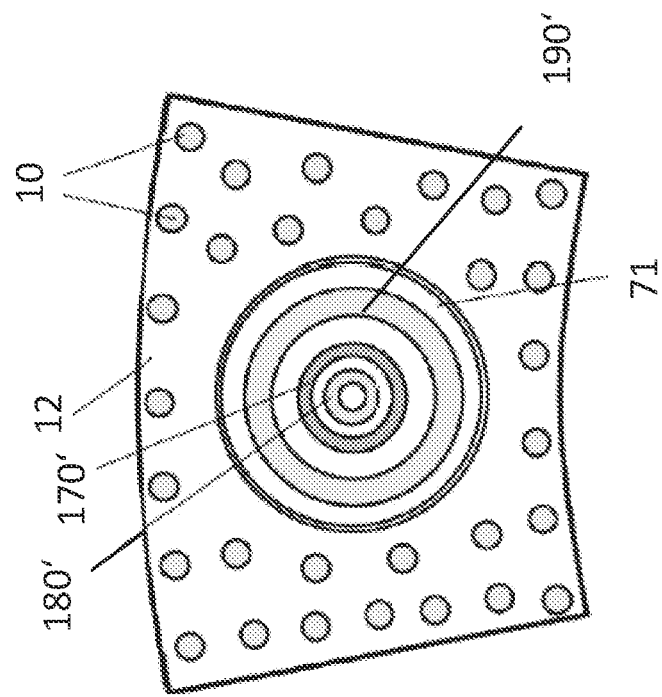

These show:

FIG. 1 in detail and in a section view, a first design variant of a proposed combustion chamber assembly, in which fuel to be preheated in a double-wall combustion chamber wall of a combustion chamber is guided within the combustion chamber wall to be cooled in the direction of a combustion chamber outlet and back again to a combustion chamber head;

FIG. 2 in a view corresponding to FIG. 1, the combustion chamber assembly showing additional air-mixing holes and cooling air bores in the combustion chamber wall and at least one combustion chamber shingle on an inner shell surface of the combustion chamber wall;

FIG. 3 in a view corresponding to FIGS. 1 and 2, a development of the combustion chamber assembly in which two heat exchanger ducts from different wall sections of the combustion chamber wall are connected to one another by a common deflection region, which additionally serves for cooling of a turbine inlet guide vane;

FIGS. 4A-4D in detail and by way of example, different variants of the combustion chamber wall for a combustion chamber assembly of FIGS. 1, 2 and 3, showing different guide elements for the guiding of the fuel within the combustion chamber wall;

FIG. 5A in detail and in section view, a further design variant of a proposed combustion chamber assembly in which a fuel is injected via multiple outflow openings at an end face of a top portion provided at the combustion chamber head;

FIG. 5B in a view corresponding to FIG. 5A, the top portion showing a multitude of heat exchanger ducts for fuel and air, integrated in the top portion;

FIGS. 6A-6B front and rear views corresponding to viewing directions A and B in FIG. 5B;

FIGS. 7A-7C different cross sections for first and second outflow openings in a top portion of FIGS. 5A to 6B;

FIG. 8 in a view corresponding to FIG. 6A, a further design variant in which first and second, each rhombus-shaped, outflow openings are disposed at the end face of the top portion, with occupation of a majority of the area of the end face in the manner of a honeycomb;

FIG. 9 in top view and in schematic form, an aircraft having two engines each having at least one fuel nozzle as per the solution proposed;

FIG. 10 in schematic form, the construction of one of the engines of the aircraft of FIG. 9, which are each operated with hydrogen;

FIG. 11 a combustion chamber assembly known from the prior art, in which a conventional fuel nozzle for the injection of kerosene is provided in a combustion chamber;

FIG. 12 looking at an end face of a nozzle head of the fuel nozzle of FIGS. 111, the installed fuel nozzle with the nozzle head accommodated in a passage opening of a heat shield.

FIG. 9 shows, in top view, an aircraft 101, for example a passenger aircraft. The aircraft 101 has a fuselage 102 having two wings, on each of which is provided an engine 103, for example a turbofan engine. A hydrogen storage tank 104 is accommodated in the fuselage 102 of the aircraft 101. In this hydrogen storage tank 104, hydrogen is stored as fuel for the engines 103, for example in liquid form. The hydrogen from the hydrogen storage tank 104 is provided via a fuel feed system 201 (cf. FIG. 10) to the engines 103, and utilized there for combustion in a respective core engine 105, in order to drive a fan of the respective engine 103.

The block diagram of FIG. 10 illustrates the construction of the core engine 105 of an engine 103 in detail. According to FIG. 10, hydrogen from the hydrogen storage tank 104 is provided as fuel to the respective core engine 105 via the fuel supply system 201. The core engine 105, in a main flow direction s that coincides with a center axis of the engine 103, has, in axial succession, a low-pressure compressor 202, a high-pressure compressor 204, a diffuser 205, a fuel injection system 206, a combustion chamber 207, a high-pressure turbine 208, a low-pressure turbine 209 and an outlet nozzle 210. The low-pressure compressor 202 and the high-pressure compressor 204 are connected to one another in the block diagram of FIG. 10 via a connecting duct 203. The high-pressure compressor 204 is driven by the high-pressure turbine 208 via a first shaft 211, while the low-pressure compressor 203 is driven by the low-pressure turbine 209 via a second shaft 212. Rather than the two-shaft design for the coupling which is apparent in FIG. 10, it is of course also possible to provide a three-shaft design.

In the operation of the engine 103, the low-pressure turbine 209 drives a fan 213 of the engine 103 via a (step-down) transmission unit 214. The transmission unit 214 is connected to the second shaft 212 on the drive side, and is coupled to the fan 213 via a fan shaft 215 on the output side. For example, the transmission unit 214 has an epicyclic step-down transmission. Alternatively or additionally, a planetary transmission may be part of the drive unit 214, although alternative drive designs are of course also possible. In principle, it is also possible to recess a transmission unit 214, such that the second shaft 212 driven by the low-pressure turbine is coupled directly to the fan 213.

FIG. 11 shows a configuration, known from the prior art, of a combustion chamber assembly with the fuel injection system 206 and the combustion chamber 207, via which the turbine stages of the high-pressure turbine 208 and of the low-pressure turbine 209 can be driven. The combustion chamber 207 defines a combustion space delineated by a combustion chamber wall 1, which extends from a combustion chamber head 11 to a combustion chamber outlet 207A. The offgas formed in the combustion in the combustion space is guided in main flow direction s via a turbine stator, especially what is called a turbine inlet guide vane 8, to the high-pressure turbine 208. Upstream, the combustion chamber 207 has the combustion chamber head 11 and, downstream thereof, a heat shield 12 accommodating a nozzle head of a fuel nozzle 7 of the fuel injection system 206. The heat shield 12 and the combustion chamber head 11 are in practice frequently joined to one another as a welded construction. The combustion chamber 207 is also disposed between a (radially) outer housing 2 and a (radially) inner housing 3 of the combustion chamber assembly.

From the high-pressure compressor 205, an air flow is guided through the diffuser 205 and lastly through pre-diffuser 6 into a housing space accommodating the combustion chamber 207. The air flow coming from the pre-diffuser 6 is divided here. A portion of the air flow is routed into the combustion space via the combustion chamber head 11, cooling air bores 10 in the heat shield 12, and the nozzle head of the fuel nozzle 7, in order to provide an ignitable air-fuel mixture therein. A further portion of the air from the pre-diffuser 6 flows in two (outer and inner) flow spaces 4 and 5 formed between an outer shell surface of the combustion chamber wall 1 and housings 2 and 3. A portion of the air flow flows here into the (outer) flow space 4 between the combustion chamber wall 1 and the outer housing 2 in which the combustion chamber 207 is fully accommodated. A further portion of air flow flows into the (inner) flow space 5 between the combustion chamber wall 1 and the radially inner housing 3. The air that passes into the inner and outer flow spaces 4 and 5 serves to cool the combustion chamber wall 1. For example, it is especially possible to guide (cooling) air from outside into the combustion chamber through cooling air bores 10 for more efficient cooling of the combustion chamber wall 1 and especially combustion chamber shingles provided thereon on the combustion space side. Furthermore, the combustion chamber wall 1 has additional air-mixing holes 9 in order to route a portion of the air from the flow spaces 4 and 5 into the combustion space as mixing air. Furthermore, air from the flow spaces 4 and 5 downstream of the combustion chamber 207 can also be utilized for cooling of the turbine stator 8.

For the provision of the ignitable air-fuel mixture, the fuel provided by the fuel injection system 206 is mixed with air in the fuel nozzle 7 in the region of the heat shield 12, and injected into the combustion chamber 207 at an end face 710 of a nozzle head 71 of the fuel nozzle 7. For this purpose, the nozzle head 71 of the fuel nozzle 7 is accordingly disposed at the combustion chamber head 11 of the combustion chamber 207. In this case, the nozzle head 71 of the fuel nozzle 7 is provided at an end of a nozzle stem 70 of the fuel nozzle 7 that projects radially inward, fixed on the outer housing 2 or a housing wall of this outer housing 2. In this case, the nozzle stem 70 projects through a passage hole 13 in the housing wall of the (outer) housing 2, and is secured with sealing via a securing flange 14 on the housing wall of the housing 2. In FIG. 11, the securing flange 14 is connected by way of example via screws 16 to the housing 2. The passage hole 13 is sealed at the housing wall of the housing 2 via a seal 15 on the securing flange 14.

FIG. 12 illustrates, looking at an inner face of the heat shield 12 facing the combustion space of the combustion chamber 207, a configuration of the nozzle head 71 of the fuel nozzle 7 that is known from the prior art. For instance, a circular ring-shaped first passage opening 170' for fuel, which is thus configured in the manner of an annular gap, is provided concentrically with respect to second and third outflow openings 180' and 190' for air that are likewise each in circular ring configuration. The individual first outflow opening 170' provided for the injecting fuel is provided here centrally at the end face of the nozzle head 71. Radially further inward, there is a central second outflow opening 180' for a first air flow. Radially further outward in turn is the further, third outflow opening 190' for a further air flow.

The configuration of a combustion chamber assembly and especially of the combustion chamber head 11 which is known from the prior art offers not inconsiderable improvement for potential, especially for a hydrogen-driven engine 103 and hence with utilization of hydrogen as fuel for the engine 103. This is where the solution proposed starts from.

Thus, in the execution variants of FIGS. 1, 2 and 3, the combustion chamber wall 1 is utilized for the preheating especially of gaseous fuel, for example hydrogen, and for the cooling of the combustion chamber wall 1. Thus, the fuel here, while being guided within the combustion chamber wall, is preheated by the comparatively high temperatures that exist in the combustion space before injection of the fuel into the combustion chamber. This is considerably advantageous specifically in the case of hydrogen, where the injection of the hydrogen at excessively low temperatures must be avoided, specifically with regard to the temperatures under which the hydrogen is stored in the hydrogen storage tank 104.

In the design variant of FIG. 1, a nozzle stem 70 secured to the housing 2 is parts of the fuel injection system 206. Within the nozzle stem 70 of the corresponding fuel nozzle 7, a fuel feed 700 is provided, via which fuel, for example hydrogen, is routed in the direction of the combustion chamber head 11. The combustion chamber head 11 in the present context has a double-wall design and is in one-piece form together with the combustion chamber wall 1 of the combustion chamber 207, or is cohesively bonded, for example welded, thereto. The fuel feed 700 opens into a distributor 701 on the combustion chamber head side, via which incoming fuel is divided into two substreams. Thus, a first substream passes into a first heat exchanger duct 1A in a radially outer wall section of the combustion chamber wall 1 which is thus closer to the housing 2. A further substream of fuel passes into a heat exchanger duct 1B in a wall section further radially outward in the combustion chamber wall 1. In each heat exchanger duct 1A, 1B, the fuel is routed first via a first duct section 1.1 proceeding from the combustion chamber head 11 in the direction of the combustion chamber outlet 207A and hence of an axial end of the combustion chamber wall 1. In the region of the combustion chamber outlet 207A, within the respective wall section of the combustion chamber wall 1, a deflection region 1.2 is provided, in which the fuel flow from the first duct section 1.2 is deflected by about 180° and routed in a second duct section 1.3 of the respective heat exchanger duct 1A or 1B. Fuel thus flows via each of heat exchanger ducts 1A, 1B at first within the combustion wall 1 from the combustion chamber head 11 downstream in the direction of the combustion chamber outlet 207A and then back to the combustion chamber head 11. Hence utilizing the entire axial length of the combustion chamber wall 1, the fuel is heated here by the combustion space and the combustion chamber wall 1 is simultaneously cooled by the fuel.

In the present context, the fuel here is guided via the first duct section 1.1 to an outer shell surface of the combustion chamber wall 1 that adjoins in the direction of the combustion chamber outlet 207A. The recycling of the fuel in the direction of the combustion chamber head 11 is then effected in the second duct section 1.3 separated from the first duct section 1.1 by a dividing wall to an inner shell surface, facing the combustion space, of the combustion chamber wall 1.

From the second duct sections 1.3 of the heat exchanger ducts 1A, 1B, the (preheated) fuel passes into a fuel line/manifold 702 at the combustion chamber head 11. Consequently, the entire fuel is routed via the fuel line 702 collectively in the direction of the nozzle head 71. The nozzle head 71 which is still accommodated here in a passage opening in the heat shield 12 then injects the preheated fuel into the combustion space together with air originating from the pre-diffuser 6 to form an ignitable air-fuel mixture.

Especially in the case of utilization of hydrogen as fuel and the associated low temperatures of the fuel guided within the combustion chamber wall 1, it is possible in the design variant of FIG. 1 to dispense with separate cooling of the combustion chamber wall 1 via a cooling air flow which is run along the radial outside and radial inside of the combustion chamber 207. In that case, there is thus also more air available for the combustion within the combustion space.

Nevertheless, it is of course possible, as illustrated by the development of FIG. 2, also additionally to utilize an additional cooling flow past the combustion chamber 207. For instance, the design variant of FIG. 2 also envisages mixing—in holes 9 and also cooling air bores 10 in the combustion chamber wall 1. Also apparent by way of example, on a radially outer wall section of the combustion chamber wall 1, on the inside, is a combustion chamber shingle 21 with air cooling 22.

In one possible development of FIG. 3, a common deflection region 1.2 is envisaged on the combustion chamber outlet 207A, in order additionally to cool the turbine inlet guide vane 8 of the high-pressure turbine 208 downstream of the combustion chamber 207 via the fuel guided in the combustion chamber wall 1. By means of the deflection region 1.2, a first duct section 1.1 of a first heat exchanger duct 1A or 1B is connected here in each case to a second duct section 1.3 of the other heat exchanger duct 1B or 1A, such that fuel is routed first from the fuel inlet 700 and via the distributor 701 in the respective radially inner or radially outer wall section of the combustion chamber wall 1 in the direction of the combustion chamber outlet 207A and hence in the direction of the deflection region 102. Subsequently, i.e. after flowing through the deflection region 1.2, the fuel is then routed in the other, radially outer or radially inner, wall section back in the direction of the combustion chamber head 11 and of the nozzle head 71. Within the common deflection region 1.2, which constitutes a cross-connection between the heat exchanger ducts 1A and 1B, the fuel is guided, for example, along a meandering flow path in order to achieve maximum cooling action at the turbine inlet guide vanes 8.

In the design variants FIGS. 1, 2 and 3, the combustion chamber head 11 and the combustion chamber wall 1 each form a portion of a fuel pathway via which fuel is routed from the fuel feed 700 to the nozzle head 71. The combustion chamber head 11 and the combustion chamber wall 1 may be designed here as a one-piece component and may, for example, be additively manufactured. Alternatively, the combustion chamber head 11 and the combustion chamber wall 1 may be manufactured as separate components and may be cohesively assembled, for example, by welding.

Figure 4A:
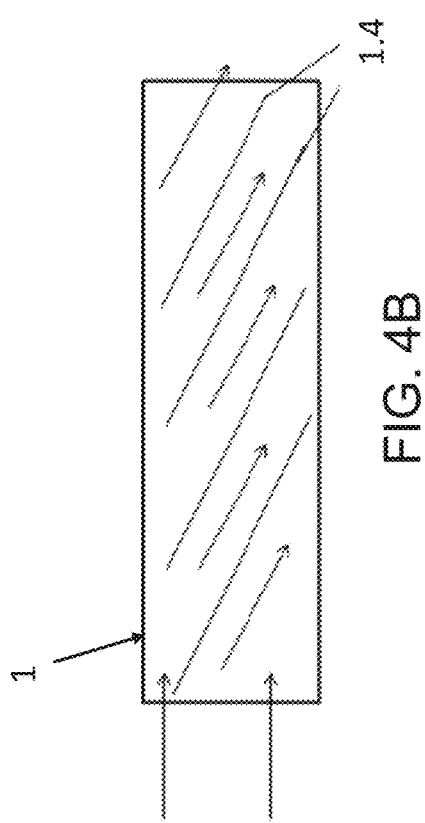
Figure 4B:
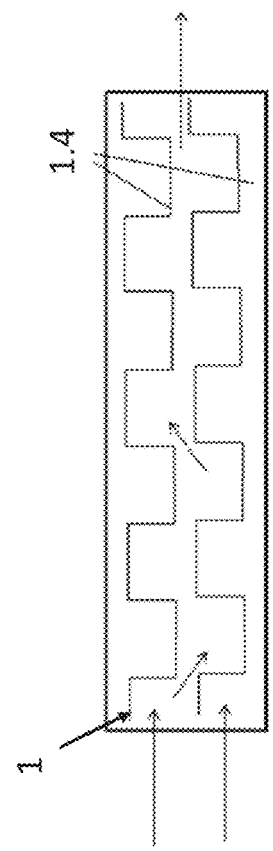
Figure 4C:
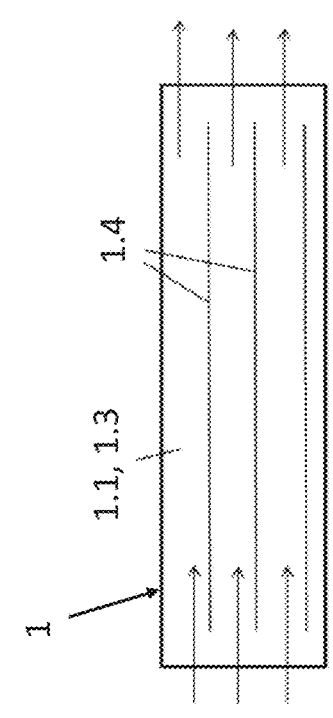
Figure 4D:
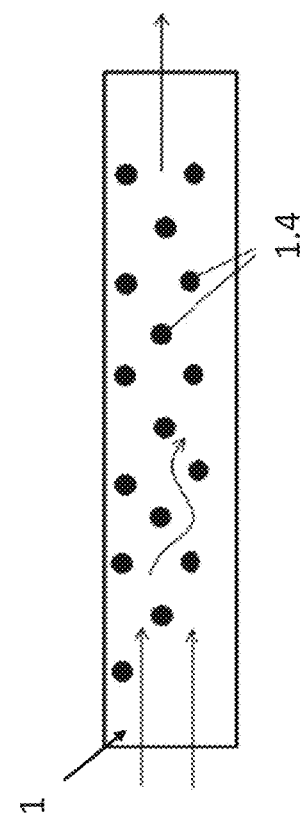

FIGS. 4A to 4D illustrate possible further configurations of the heat exchanger ducts 1A, 1B, and especially different configurations for internal guiding of a fuel flow within the combustion chamber wall 1. What are shown here, in the details of FIGS. 4A, 4B, 4C and 4D, are different guide elements 1.4 and especially guide elements 1.4 with different orientation, in order to provide efficient guiding of the fuel within the combustion chamber wall 1 and a suitable large area for the desired heat transfer. In the design variant of FIG. 4A, for example, axially aligned guide elements 1.4 are provided, while the design variant of 4B envisages guide elements 1.4 arranged obliquely and hence inclined with respect to the main flow direction s. The design variant of FIG. 4C shows the guide elements 1.4 around which a fuel flow is guided in a meandering manner. A meandering flow of the fuel is also envisaged in the gradated design of guide elements 1.4 corresponding to FIG. 4D.

While the design variants of FIGS. 1 to 4D concentrate particularly on a fuel flow within the combustion chamber wall 1 in order to inject preheated fuel, for example, via a nozzle head 71 into the combustion space of the combustion chamber 207, what is envisaged in an execution variant of FIGS. 5A and 5B is a top portion 11A on the combustion chamber head side rather than a nozzle head 71. This top portion 11A has an integrated multitude of heat exchanger ducts 17, 18 for fuel to be injected into the combustion space and air to be injected into the combustion space. The multitude of heat exchanger ducts 17, 18 each open into a corresponding number of first and second outflow openings at an end face of the top portion 11A that faces the combustion space, via which fuel or air is discharged into the combustion space to form a desired air-fuel mixture.

In the execution variant of FIGS. 5A and 5B, the fuel feed 700 opens directly into a collector 71A, via which fuel is distributed between a multitude of heat exchanger ducts 17 in the top portion 11A that are envisaged for the heating of the fuel. The collector 71A and the top portion 11A here may be manufactured collectively in one-piece form. For the design of the different heat exchanger ducts 17, 18, the top portion 11A may optionally also be additively manufactured together with the collector 71A. The collector 71A may also be connected to the nozzle stem 70 or the fuel feed 700 by welding or soldering.

The heat exchanger ducts 17 and 18 that are arranged uniformly either in radial or axial distribution in the top portion 11A are envisaged for heat transfer between the individual fuel flows and air flows that are guided to the respective first and second outflow openings 170 and 180. For instance, a fuel is still effectively preheated by means of the incoming air via the top section 11A before being injected into the combustion space. This is advantageous to a not inconsiderable degree particularly for hydrogen to be injected as fuel. The multitude of outflow openings 170 and 180 for fuel on the one hand and air on the other hand that are provided at the end face in the top portion 11A may promote the formation of mixtures particularly in the case of fuel to be injected in gaseous form.

The end face of the top portion 11A that is apparent in FIG. 6A may be designed in the manner of the heat shield 12 and hence especially in tetragonal form. The first and second outlet openings 170, 180 for fuel and air are distributed uniformly on the end face of the top portion 11A that faces the combustion space, and occupy a majority of the area of the end face here.

An inflow opening to the heat exchanger ducts 18 for air may be provided on a curved outer face of the top portion 11. It is via this multitude of inflow openings apparent in FIG. 6B that air coming from the high-pressure compressor 204 enters the top section 11A.

As illustrated by FIGS. 7A, 7B and 7C, the first and second outlet openings 170, 180 may have different cross-sectional shapes and may, for example, be round, especially circular (FIG. 7A), rhombus-shaped (7B) or hexagonal (FIG. 7C). Analogously, the heat exchanger ducts 17, 18 for the individual discrete fuel and air flows within the top section 11A may have different cross-sectional forms corresponding to the outflow openings 170, 180.

In order to further increase heat exchange between air and fuel via the heat exchanger ducts 17 and 18 integrated into the top section 11A, one option may be an arrangement of the heat exchanger ducts 17, 18 within the top portion 11A according to a pattern in which merely a narrow land is present in each case between adjacent heat exchanger ducts 17, 18 and hence also between adjacent outflow openings 170, 180. The heat exchanger ducts 17, 18 and their outflow openings 170, 180 are then arranged, for example, in the manner of a honeycomb in a front view of the end face of the top portion 11A according to FIG. 8. In the case of such an arrangement, it is possible to directly achieve occupation of more than 75%, especially more than 85%, of the area of the end face by first and second outlet openings 170, 180, and maximized heat exchange between fuel and air within the top portion 11A.

The configuration of a combustion chamber head 11 with a top portion 11A corresponding to the design variants of FIGS. 5A to 8 can be combined directly with a fuel-cooled combustion chamber wall 1 corresponding to FIGS. 1 to 4D. In that case, for example, second duct sections 1.3 of the heat exchanger ducts 1A, 1B on the combustion chamber wall side do not open into a fuel line/manifold 702 that guides the fuel to a nozzle head 71. Here, instead, the fuel is routed from the second duct sections 1.3 into the collector 71A and thence into the multitude of heat exchanger ducts 17 on the top portion side.

LIST OF REFERENCE NUMERALS 1 combustion chamber wall
1A, 1B heat exchanger duct
1.1, 1.3 duct section
1.2 deflection region
1.4 guide element
2 outer housing
3 inner housing
4 outer flow space
5 inner flow space
6 pre-diffuser
7 fuel nozzle
70 nozzle stem
700 fuel feed
701 distributor
702 fuel line/manifold
71 nozzle head
71A collector
710 end face
8 turbine stator
9 air-mixing hole
10 cooling air bore
11 combustion chamber head
11A top portion
12 heat shield
13 passage hole
14 securing flange
15 seal
16 screw
17 heat exchanger duct/fuel line
170, 170' outflow opening for fuel
18 heat exchanger duct/air line
180, 180' outflow opening for air
190' third outflow opening (for air)
20 distributor
21 combustion chamber shingle
22 air cooling
101 airplane
102 fuselage
103 (turbofan) engine
104 hydrogen storage tank
105 core engine
201 fuel feed system
202 low-pressure compressor
203 connecting duct
204 high-pressure compressor
205 diffuser
206 fuel injection system
207 combustion chamber
207A combustion chamber outlet
208 high-pressure turbine
209 low-pressure turbine
209 outlet nozzle
211 first shaft
212 second shaft
213 fan
214 (step-down) transmission unit
215 fan shaft
s main flow direction

The invention claimed is:

1. A combustion chamber assembly for an engine, comprising
a combustion chamber that defines a combustion space delineated by a combustion chamber wall and extending in a main flow direction from a combustion chamber head to a combustion chamber outlet, and
a fuel injection system which is joined to the combustion chamber wall at the combustion chamber head and includes at least one fuel feed for fuel and a nozzle head for the injection of the fuel into the combustion space,
wherein the combustion chamber wall includes at least one integrated heat exchanger duct via which the fuel is routed within a first duct section of the heat exchanger duct which is connected to the at least one fuel feed from the combustion chamber head in a direction of the combustion chamber outlet and, after flowing through a deflection region, in a second duct section of the heat exchanger duct, back in a direction of the combustion chamber head and of the nozzle head;
wherein the deflection region is provided for cooling of at least one component of a turbine downstream of the combustion chamber.

2. The combustion chamber assembly according to claim 1, wherein the combustion chamber wall includes an inner shell surface facing the combustion space and an opposing outer shell surface, and the first duct section adjoins the outer shell surface, while the second duct section adjoins the inner shell surface.

3. The combustion chamber assembly according to claim 1, and further comprising a dividing wall between the first and second duct sections within the combustion chamber wall.

4. The combustion chamber assembly according to claim 1, wherein the first duct section in the combustion chamber wall extends over a majority of a total length of the combustion space.

5. The combustion chamber assembly according to claim 1, wherein the combustion chamber wall, based on the main flow direction, includes a radially outer wall section and a radially inner wall section, and the combustion chamber wall includes at least one integrated heat exchanger duct positioned in each of the radially outer wall section and the radially inner wall section.

6. The combustion chamber assembly according to claim 5, wherein, via a distributor connected to the at least one fuel feed which is provided at the combustion chamber head, a fuel flow coming from the at least one fuel feed is divided between the at least one integrated heat exchanger duct positioned in each of the radially outer wall section and the radially inner wall section.

7. The combustion chamber assembly according to claim 6, wherein the distributor is configured for equal distribution of the fuel flow between the at least one integrated heat exchanger duct positioned in each of the radially outer wall section and the radially inner wall section.

8. The combustion chamber assembly according to claim 6, wherein the distributor is configured for distribution of the fuel flow in different portions between the at least one integrated heat exchanger duct positioned in each of the radially outer wall section and the radially inner wall section.

9. The combustion chamber assembly according to claim 6, and further comprising a fuel line for the supply of the fuel at the nozzle head is provided at the combustion chamber head, and each of the at least one integrated heat exchanger ducts include a second duct section connected to the fuel line.

10. The combustion chamber assembly according to claim 9, wherein the fuel is guided via the fuel line on the combustion chamber head side, by which the heat exchanger ducts of the combustion chamber wall are connected, to the heat exchanger ducts of the top portion that forms the nozzle head of the fuel injection system.

11. The combustion chamber assembly according to claim 6, wherein each of the at least one integrated heat exchanger ducts is connected to one another beyond the combustion chamber head.

12. The combustion chamber assembly according to claim 11, wherein both of the at least one integrated heat exchanger ducts are connected to one another via the deflection region.

13. The combustion chamber assembly according to claim 12, wherein a first duct section of any of the at least one integrated heat exchanger duct is connected via the deflection region to a second duct section of another of the at least one integrated heat exchanger duct, such that the fuel is routed first within the radially inner or radially outer wall section of the combustion chamber wall in the direction of the combustion chamber outlet and then is routed in the other, radially outer or radially inner, wall section back in the direction of the combustion chamber head.

14. The combustion chamber assembly according to claim 1, wherein the combustion chamber assembly is configured for injection of a gaseous fuel.

15. An engine with a combustion chamber assembly according to claim 1.

16. A combustion chamber assembly for an engine, comprising:
 a combustion chamber that defines a combustion space delineated by a combustion chamber wall and extending in a main flow direction from a combustion chamber head to a combustion chamber outlet, and
 a fuel injection system which is joined to the combustion chamber wall at the combustion chamber head and includes at least one fuel feed for fuel and a nozzle head for injection of the fuel into the combustion space,
 wherein the combustion chamber wall includes at least one integrated heat exchanger duct via which the fuel is routed within a first duct section of the heat exchanger duct which is connected to the at least one fuel feed from the combustion chamber head in a direction of the combustion chamber outlet and, after flowing through a deflection region, in a second duct section of the heat exchanger duct, back in a direction of the combustion chamber head and of the nozzle head;
 wherein integrated in a top portion provided at the combustion chamber head and configured for provision of an air-fuel mixture, at an end face facing the combustion space, are a plurality of first outflow openings for fuel and a plurality of second outflow openings for air, and heat exchanger ducts for heat transfer between fuel flowing to the first outflow openings in the top portion and air flowing to the second outflow openings in the top portion.

17. The combustion chamber assembly according to claim 16, wherein integrated in the top portion are a plurality of heat exchanger ducts for fuel and a plurality of heat exchanger ducts for air.

18. The combustion chamber assembly according to claim 17, wherein the plurality of heat exchanger ducts for fuel and the plurality of heat exchanger ducts for air are distributed uniformly in the top portion.

19. The combustion chamber assembly according to claim 16, wherein the first and second outflow openings are disposed in uniform distribution at the end face of the top portion.

20. The combustion chamber assembly according to claim 16, wherein at least some of the first and second outflow openings are disposed in a pattern at the end face of the top portion in which adjacent outflow openings are separated by an elongated land in a front view of the end face.

21. The combustion chamber assembly according to claim 16, wherein the first and/or second outflow openings have a circular or polygonal, square, rhombus-shaped or hexagonal, cross section.

22. The combustion chamber assembly according to claim 16, wherein a plurality of inflow openings for air to be routed to the second outflow openings is provided on an outer face of the top portion remote from the combustion space.

23. The combustion chamber assembly according to claim 16, wherein the top portion together with the at least one integrated heat exchanger ducts is an additively manufactured component.

24. The combustion chamber assembly according to claim 16, wherein the at least one fuel feed is connected to a collector which is connected in turn to a plurality of heat exchanger ducts of the top portion which are provided for the fuel.

25. The combustion chamber assembly according to claim 24, wherein the collector and the top portion are monolithic.

26. A combustion chamber assembly for an engine, comprising:
 a combustion chamber that defines a combustion space delineated by a combustion chamber wall and extending in a main flow direction from a combustion chamber head to a combustion chamber outlet, and
 a fuel injection system including at least one fuel feed for a fuel to be injected into the combustion space,
 wherein, integrated in a top portion provided at the combustion chamber head and configured for provision of an air-fuel mixture, at an end face facing the combustion space, are a plurality of first outflow openings for fuel and a plurality of second outflow openings for air, and heat exchanger ducts for heat transfer between the fuel flowing to the first outflow openings in the top portion and air flowing to the second outflow openings in the top portion.

* * * * *